(78.)
BERRY HOLLIS.
Improvement in Husk Splitters.
No. 122,017.                              Patented Dec. 19, 1871.
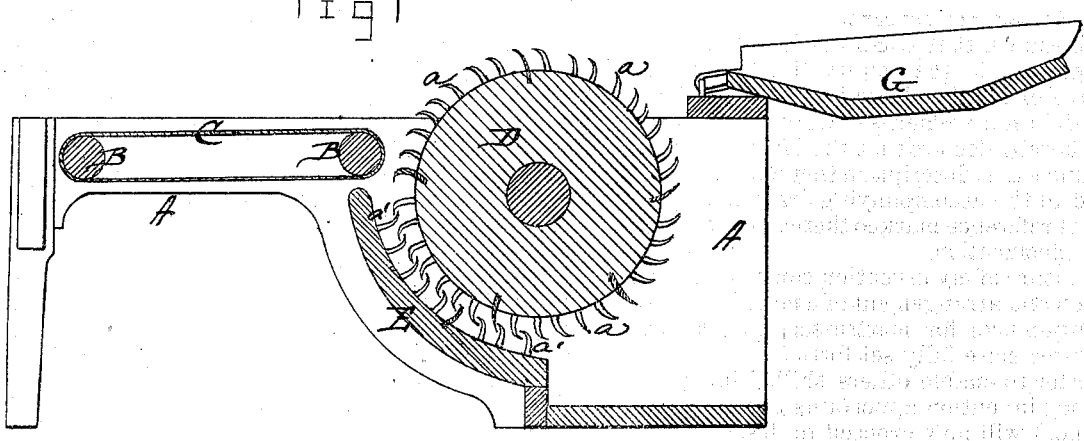
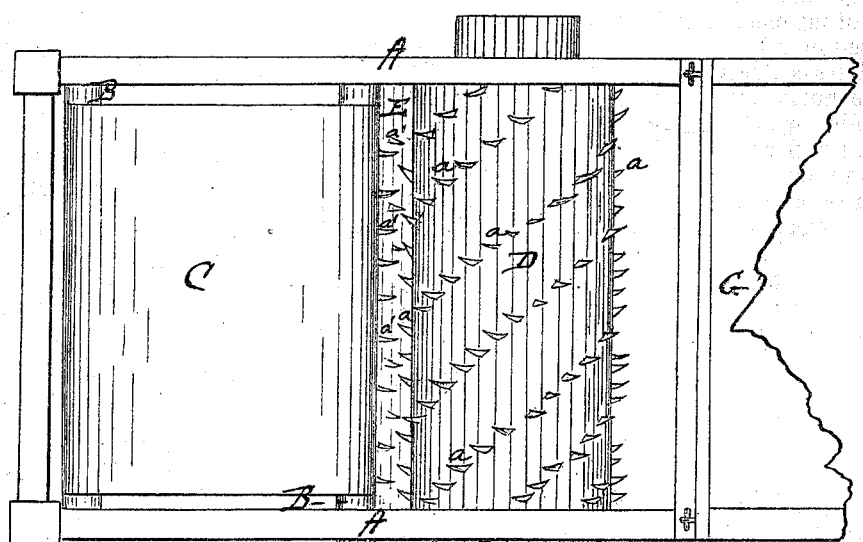
Witnesses:
Franck L. Durand
C. L. Evert
Inventor
Berry Hollis
per
Alexander Mason
Attorneys.

UNITED STATES PATENT OFFICE.

BERRY HOLLIS, OF RANDOLPH, ILLINOIS.

IMPROVEMENT IN HUSK-SPLITTERS.

Specification forming part of Letters Patent No. 122,017, dated December 19, 1871.

*To all whom it may concern:*

Be it known that I, BERRY HOLLIS, of Randolph station, in the county of McLean and in the State of Illinois, have invented certain new and useful Improvements in Corn-Husk Splitter; and do hereby declare that the following is a full, clear, and exact description thereof, reference being had to the accompanying drawing and to the letters of reference marked thereon making a part of this specification.

The nature of my invention consists in the construction and arrangement of a machine for splitting corn-husks for mattresses, &c., as will be hereinafter more fully set forth.

In order to enable others skilled in the art to which my invention appertains to make and use the same, I will now proceed to describe its construction and operation, referring to the annexed drawing, in which—

Figure 1 is a longitudinal vertical section, and Fig. 2 is a plan view of my machine.

A represents the frame of my machine, in which are two rollers, B B, placed on a level across the frame. Around these rollers is placed an endless apron, C, upon which the husks are placed and carried toward a large roller or cylinder, D, provided on its circumference with several series of teeth, $a$ $a$, set spirally, as shown in Fig. 2. These teeth are bent forward in the shape of hooks, with the ends sharp pointed. From the front roller B, downward under the toothed roller D, is a concave, E, provided with similar teeth $a'$ $a'$, which are curved upward and so arranged that the teeth $a$ $a$ will pass between them as the cylinder revolves. Upon one end of the cylinder D is a pulley, $b$, connected, by a belt, $d$, with a pulley, $e$, on the end of the front roller B, thus communicating the motion from said cylinder to the apron around the rollers B B, so as to carry the husks toward the toothed cylinder. The husks, in passing between the cylinder D and concave E, are split and prepared in suitable shape to be used for stuffing mattresses and other similar articles. Over the cylinder D is a hinged concave cover, G, as shown.

Having thus fully described my invention, what I claim as new, and desire to secure by Letters Patent, is—

The within-described corn-husk splitter, consisting of the frame A, rollers B B, endless apron C, roller or cylinder D, concave E, sharp-pointed hook-shaped teeth $a$ $a$ and $a'$ $a'$, and the cover G, all constructed and arranged substantially as and for the purposes herein set forth.

In testimony that I claim the foregoing I have hereunto set my hand this 28th day of October, 1871.

BERRY HOLLIS.

Witnesses:
THOS. SLADE,
W. M. HATCH.

(78)